UNITED STATES PATENT OFFICE.

CONRAD SCHRAUBE, OF LUDWIGSHAFEN, GERMANY, ASSIGNOR TO THE BADISCHE ANILIN AND SODA FABRIK, OF SAME PLACE.

SUBSTANTIVE BLUE DYE.

SPECIFICATION forming part of Letters Patent No. 524,220, dated August 7, 1894.

Application filed June 5, 1893. Serial No. 476,636. (Specimens.) Patented in Germany May 8, 1890, No. 54,662; in France June 19, 1890, No. 206,501, and in England June 21, 1890, No. 9,676.

*To all whom it may concern:*

Be it known that I, CONRAD SCHRAUBE, doctor of philosophy, a subject of the King of Prussia, residing at Ludwigshafen-on-the-Rhine, in the Kingdom of Bavaria and Empire of Germany, have invented new and useful Improvements in the Manufacture of a New Blue Substantive Cotton-Dye, (for which I have obtained patents in Germany, No. 54,662, dated May 8, 1890; in England, No. 9,676, dated June 21, 1890, and in France, No. 206,501, dated June 19, 1890,) of which the following is a specification.

My invention relates to the manufacture of a substantive blue dye which fixes itself upon vegetable fiber without the aid of a mordant.

The process of the manufacture of my new dye consists in the following operations: First. 1.1′ naphthylamine-monosulfoacid is melted in the caustic alkaline melt to yield 1.1′ amido-naphthol. Second. The 1.1′ amido-naphthol obtained in this or any other way is sulfonated with concentrated sulfuric acid to obtain 1.1′ amido-naphthol-sulfoacid. Third. The 1.1′ amido-naphthol-sulfoacid obtained in this or any other way is treated with benzoyl-chlorid, whereby a benzoyl-derivative thereof is obtained. Fourth. The tetrazo-compound from diamido-diphenyl-dicarboxylic acid is combined with the said benzoyl-amido-naphthol-sulfoacid (obtained as mentioned or in any other way) in the proportions of one molecule of the tetrazo-compound to two molecules of the sulfo-acid.

No claim is herein made to the intermediate products obtained in the process herein described for the production of my new dye.

The following examples will illustrate the manner in which my invention can be carried into practical effect and the new dye obtained.

*Example 1. Production of 1.1′ amido-naphthol.*—Take about one part of 1.1′ naphthylamine-mono-sulfoacid (also called 1.8 naphthylamine sulfo-acid; see Erdmann, *Annalen der Chemie*, 247, 318, and Schultz, *Berichte der Deutschen Chemischen Gesellschaft*, 20, 3161) and add it gradually to about three parts of a melted mixture of caustic potash and caustic soda in equal proportions (with a little water added) at a temperature of about 200° to 210° centigrade. Then raise the temperature to and maintain it at about 230° to 240° centigrade, until the following test indicates the end of the operation, dissolve test portions from time to time in about ten times the quantity of boiling dilute hydrochloric acid of such strength that an acid solution is obtained, filter if necessary, then if on cooling 1.1′ naphthylamine-mono-sulfo-acid separates, the heating is continued, if no such separation takes place, the operation is interrupted.

The 1.1′ amido-naphthol can be isolated by dissolving the melt in about twenty parts of hydrochloric acid (containing about fifteen per cent. real hydrochloric acid (HCl) and adding one part of Glauber's salt, stirring well. The amido-naphthol separates out in the form of its difficultly soluble sulfate. Filter, press and dry.

*Example 2. Preparation of amido-naphthol-mono-sulfo-acid.*—Stir together about one part of 1.1′ amido-naphthol-sulfate with about four parts of ordinary concentrated sulfuric acid at the ordinary temperature of the atmosphere for say about six to eight hours. At a temperature of about 15° to 20° centigrade the desired mono-sulfo-acid forms. It is but slightly soluble in water and the progress of the operation can at any time be ascertained by precipitating a test portion of the acid mixture with water and adding soda solution. If a practically clear solution be obtained, the mono-sulfo acid may at once be isolated, but if an undissolved precipitate be present in the soda solution, the amount thereof affords an indication of the proportion of unsulfonated amido-naphthol in the mixture and the sulfonation is continued, until the test shows a practically clear solution.

To isolate the amido-naphthol-mono-sulfo-acid, pour the acid mixture into about ten parts of ice water and filter, wash, press and purify by conversion into the calcium salt by means of milk of lime, filtering the solution thereof from all insoluble matter and reprecipitating the amido-naphthol-mono-sulfo-acid with hydrochloric acid. Filter, wash, press and dry.

*Example 3. Preparation of 1.1' benzoyl-amido-naphthol-mono-sulfo-acid.*—Dissolve about ten parts of 1.1' amido-napthol-mono-sulfo-acid in a solution of about six and a quarter parts of calcined soda in about seventy-five parts of water. Cool the solution to below 5° centigrade, and then add carefully (during about one hour) about six parts of benzoyl-chlorid. Agitate the mixture the whole time and keep the temperature below 5° centigrade. The benzoyl-amido-naphthol-mono-sulfo-acid begins to separate out in bright crystals. Continue stirring until the quantity of separated benzoyl-compound no longer increases, then filter and press and preserve the compound for use in the form of paste.

*Example 4. Preparation of a substantive blue dye from 1.1' benzoyl-amido-naphthol-mono-sulfo-acid which dyes cotton from the ordinary alkaline bath.*—Take about thirty-five parts of hydrochlorid of diamido-diphenyl-dicarboxylic acid, (NH$_2$:COOH1:2) and heat with about one hundred parts of water until a uniform mixture is attained; cool the mixture; add about fifty-eight parts of hydrochloric acid (containing about twenty-five per cent. of real acid (HCl) and diazotize after addition of about fifty parts of ice with a solution of about fourteen parts of sodium nitrite in forty parts of water, stir well for several hours and then run the tetrazo-compound into a solution of eighty parts 1.1' benzoyl-amido-naphthol-sulfo-acid and eighty parts of calcined soda in two thousand five hundred parts of water, stir for about two days, precipitate the dyestuff formed with about fifteen hundred parts of a saturated solution of common salt; boil and filter hot, press and dry. If it be desired to purify the dyestuff, dissolve it again in hot water and reprecipitate with common salt solution.

My new dyestuff so obtained is chemically a sodium salt of the dis-azo-compound of tetrazo-diamido diphenyl-dicarboxylic acid with two molecules of benzoyl-amido-naphthol-sulfoacid, but I do not wish to be understood as limiting myself to the dye in the form of sodium salt as any other soluble salt could obviously be used. Neglecting the alkali in the compound, its composition may be represented by the following formula:

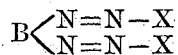

where B stands for the residue of the diamido-diphenyl-dicarboxylic-acid and X for that of benzoyl 1. 1' amido-naphthol-sulfo-acid.

My new dyestuff occurs as a dark colored powder and dyes unmordanted cotton from a weakly alkaline bath a pure blue color. It is rather slightly soluble in cold water, in hot water it dissolves more readily. It is practically insoluble in absolute alcohol, ether and benzene, on adding a mineral acid to the aqueous solution the free acid is precipitated. The dye gives a blue solution in cold sulfuric acid which on heating first turns green, subsequently the dye is entirely decomposed; if the cold sulfuric acid solution be gradually diluted with water, it first turns violet and subsequently a violet precipitate is obtained. If soda be added to the aqueous solution the latter turns violet, caustic soda similarly changes the color to magenta-red.

My new dye can be recognized by the following characteristic testing operation, whereby the benzoyl-group is split off and obtained in the form of benzoic acid. Melt about one or two grams of caustic potash in a silver crucible and add a small quantity of the dye, heat the melt to about 250° to 270° centigrade, till the melt has become brown. Allow to cool, dissolve in water, acidify with sulfuric acid, boil and filter hot. Allow to cool and extract with ether, on evaporating the ethereal extract an oily residue is obtained which solidifies on standing. This consists of benzoic acid which can be recognized by its well known properties.

What I claim as new, and desire to secure by Letters Patent, is—

1. The new substantive blue dyestuff which can be derived from the tetrazo-compound of diamido-diphenyl-dicarboxylic acid and 1. 1' benzoyl-amido-naphthol-sulfo acid and which is rather slightly soluble in cold water, more readily soluble in hot water, practically insoluble in absolute alcohol, ether and benzene, and which upon treatment with caustic potash and subsequently with sulfuric acid, yields benzoic acid substantially as described.

2. The within described process for the manufacture of a substantive blue dyestuff which process consists in combining the tetrazo-compound of diamido-diphenyl-dicarboxylic acid with 1. 1' benzoyl-amido-naphtholsulfo acid substantially as described.

In testimony whereof I have hereunto set my hand in the presence of two subscribing witnesses.

CONRAD SCHRAUBE.

Witnesses:
ERNEST F. EHRHARDT,
FRIEDRICH DIETZ.